(12) United States Patent
Wilson et al.

(10) Patent No.: US 9,133,553 B2
(45) Date of Patent: Sep. 15, 2015

(54) EXTERNALLY-REINFORCED WATER ELECTROLYZER MODULE

(71) Applicant: Next Hydrogen Corporation, Mississauga (CA)

(72) Inventors: Chris Wilson, Port Perry (CA); Michael Stemp, Toronto (CA); James Hinatsu, Mississauga (CA)

(73) Assignee: Next Hydrogen Corporation (CA)

( * ) Notice: Subject to any disclaimer, the term of this patent is extended or adjusted under 35 U.S.C. 154(b) by 224 days.

(21) Appl. No.: 13/757,478

(22) Filed: Feb. 1, 2013

(65) Prior Publication Data
US 2014/0069808 A1    Mar. 13, 2014

Related U.S. Application Data

(60) Provisional application No. 61/700,550, filed on Sep. 13, 2012.

(51) Int. Cl.
| | |
|---|---|
| *C25B 9/00* | (2006.01) |
| *C25B 1/08* | (2006.01) |
| *H01M 2/10* | (2006.01) |
| *C25B 9/18* | (2006.01) |
| *C25B 9/20* | (2006.01) |

(52) U.S. Cl.
CPC ... *C25B 1/08* (2013.01); *C25B 9/00* (2013.01); *C25B 9/18* (2013.01); *C25B 9/206* (2013.01); *H01M 2/1016* (2013.01); *Y02E 60/366* (2013.01)

(58) Field of Classification Search
CPC .......... H01M 2/1016; H01M 10/0468; H01M 10/0481; C25B 9/18; C25B 9/20–9/206; C25B 9/00; C25B 9/06–9/10

USPC .......... 205/628–639; 204/252–258, 263–270, 204/275.1–278
See application file for complete search history.

(56) References Cited

U.S. PATENT DOCUMENTS

| | | |
|---|---|---|
| 2,075,688 A | 3/1937 | Zdansky |
| 2,683,116 A | 7/1954 | Zdansky |

(Continued)

FOREIGN PATENT DOCUMENTS

| | | |
|---|---|---|
| JP | 57094579 A | 6/1982 |
| JP | 07233493 A | 9/1995 |

(Continued)

OTHER PUBLICATIONS

F. Vitse, M. Cooper and G.G. Botte, "On the use of ammonia electrolysis for hydrogen production", J. Power Sources 142, (2005) 18.

(Continued)

*Primary Examiner* — Nicholas A Smith
*Assistant Examiner* — Brian W Cohen
(74) *Attorney, Agent, or Firm* — Harness, Dickey & Pierce, P.L.C.

(57) ABSTRACT

A structural plate with external reinforcing means is provided for an electrolyzer module. The structural plate defines at least one degassing chamber and a half cell chamber opening. The external reinforcing means contact the structural plate for mitigating outward displacement of the structural plate in response to fluid pressure within the structural plate. The structural plate and the external reinforcing means define interlocking features for achieving contact and corresponding mechanical reinforcement.

14 Claims, 6 Drawing Sheets

(56) References Cited

U.S. PATENT DOCUMENTS

| | | |
|---|---|---|
| 4,204,939 A | 5/1980 | Boulton et al. |
| 4,465,570 A | 8/1984 | Oda et al. |
| 4,758,322 A | 7/1988 | Sioli |
| 5,512,145 A | 4/1996 | Hollenberg |
| 5,592,028 A | 1/1997 | Pritchard |
| 6,153,083 A | 11/2000 | Hofmann et al. |
| 6,554,978 B1 | 4/2003 | Vandenborre |
| 6,645,659 B2 * | 11/2003 | Bisaka et al. ............ 429/454 |
| 6,864,596 B2 | 3/2005 | Maiwald et al. |
| 6,912,450 B2 | 6/2005 | Fairlie et al. |
| 6,956,300 B2 | 10/2005 | Gizara |
| 7,060,379 B2 | 6/2006 | Speranza et al. |
| 7,062,360 B2 | 6/2006 | Fairlie et al. |
| 7,075,189 B2 | 7/2006 | Heronemus et al. |
| 7,088,012 B2 | 8/2006 | Gizara |
| 7,199,482 B2 | 4/2007 | Hopewell |
| 7,245,039 B2 | 7/2007 | DuHamel |
| 7,314,539 B2 | 1/2008 | Brand et al. |
| 7,332,063 B2 | 2/2008 | Sioli |
| 7,353,085 B2 | 4/2008 | Rusta-Sallehy et al. |
| 7,397,142 B1 | 7/2008 | Cooper |
| 7,759,812 B2 | 7/2010 | Taylor et al. |
| 7,892,407 B2 | 2/2011 | Gibson et al. |
| 7,906,007 B2 | 3/2011 | Gibson et al. |
| 8,003,268 B2 | 8/2011 | Smith |
| 8,308,917 B2 | 11/2012 | Hinatsu et al. |
| 2002/0033332 A1 | 3/2002 | Handa |
| 2004/0131902 A1 | 7/2004 | Frank et al. |
| 2005/0044853 A1 | 3/2005 | Yoshino |
| 2005/0121334 A1 | 6/2005 | Sumita |
| 2005/0165511 A1 | 7/2005 | Fairlie |
| 2006/0065302 A1 | 3/2006 | Gibson et al. |
| 2006/0093890 A1 * | 5/2006 | Steinbroner ............ 429/37 |
| 2006/0208571 A1 | 9/2006 | Fairlie |
| 2007/0001461 A1 | 1/2007 | Hopewell |
| 2007/0026283 A1 | 2/2007 | LaConti et al. |
| 2007/0215492 A1 | 9/2007 | Vandenborre |
| 2007/0246943 A1 | 10/2007 | Chang et al. |
| 2008/0047502 A1 | 2/2008 | Morse |
| 2008/0083614 A1 * | 4/2008 | Swalla et al. ............ 204/242 |
| 2008/0121525 A1 | 5/2008 | Doland |
| 2008/0127646 A1 | 6/2008 | Doland |
| 2009/0229990 A1 * | 9/2009 | Hinatsu et al. ............ 205/334 |
| 2010/0012503 A1 | 1/2010 | Hinatsu et al. |
| 2011/0042228 A1 | 2/2011 | Hinatsu et al. |

FOREIGN PATENT DOCUMENTS

| | | |
|---|---|---|
| JP | 2002371396 A | 12/2002 |
| JP | 2003317763 A | 11/2003 |
| JP | 2005330515 A | 12/2005 |
| JP | 2006345649 A | 12/2006 |
| WO | 9528510 A1 | 10/1995 |
| WO | 9832900 A1 | 7/1998 |
| WO | 9940030 A2 | 8/1999 |
| WO | 2006060912 A1 | 6/2006 |
| WO | 2010006423 A1 | 1/2010 |

OTHER PUBLICATIONS

International Search Report (in English), Written Opinion of International Searching Authority (in English) for PCT/CA2009/000960, ISA/CA mailed Oct. 2, 2009.

M. Kondoh, et al., "Development of solid polymer-electrolyte water electrolyse" Journal of New Materials for Electrochemical Systems 3 (2000) pp. 61-65.

Notification Concerning Transmittal of International Preliminary Report on Patentability for PCT/CA2009/000960 (Jan. 27, 2011).

Notification of Transmittal of the International Search Report and the Written Opinion for PCT/CA2009/001530 (Jan. 29, 2010).

Office Action received in related Chinese patent application and English translation (Feb. 22, 2012).

S. Stucki, et al. "PEM water electrolysers: evidence for membrane failure in 100kW demonstration plants", Journal of Applied Electrochemistry 28 (1998) 1041-1049.

Written Opinion of the International Searching Authority, PCT/CA2010/001161, pp. 1-7, (Nov. 10, 2010), and Transmittal of the International Search Report for PCT/CA2010/001161, pp. 1-5 (Nov. 10, 2010).

* cited by examiner

EXTERNALLY-REINFORCED WATER ELECTROLYZER MODULE

CROSS-REFERENCE TO RELATED APPLICATION

This application claims the benefit of U.S. Provisional Application No. 61/700,550 filed on Sep. 13, 2012. The disclosure of the above application is herein incorporated by reference.

FIELD OF THE INVENTION

The present invention relates to the design of water electrolysers for the production of hydrogen and oxygen gases at elevated pressures, and more particularly, to alkaline and polymer electrolyte membrane (PEM) type electrolyser stacks and electrolyser modules with enhanced capability for operation at elevated pressures, and components therefor.

BACKGROUND OF THE INVENTION

Electrolysers use electricity to transform reactant chemicals to desired product chemicals through electrochemical reactions, i.e., reactions that occur at electrodes that are in contact with an electrolyte. Hydrogen is a product chemical of increasing demand for use in chemical processes, and also potentially for use in hydrogen vehicles and equipment powered by hydrogen fuel cell engines or hydrogen internal combustion engines (or hybrid hydrogen vehicles, also partially powered by batteries). Water electrolysers, which produce hydrogen and oxygen from water and electricity, are the most common type of electrolyser used for production of gaseous hydrogen as the main product. The most common types of commercial water electrolysers are alkaline water electrolysers (AWE) and polymer electrolyte membrane (PEM) water electrolysers.

As used herein, the terms "half cell", "half electrolysis cell" and equivalent variations thereof refer to a structure comprising one electrode and its corresponding half cell chamber that provides space for gas-liquid (or gas) flow out of the half cell. The term "cathode half cell" refers to a half cell containing a cathode, and the term "anode half cell" refers to a half cell containing an anode.

As used herein, the terms "cell", "electrolysis cell" and equivalent variations thereof refer to a structure comprising a cathode half cell and an anode half cell. A cell also includes a separator membrane (referred to herein after as a "membrane"), typically located between, and in close proximity to, in contact with, or integral with, the cathodes and anodes. The functionality of the membrane is to maintain the hydrogen and oxygen gases produced separate and of high purity, while allowing for ionic conduction of electricity between the anode and cathode. A membrane therefore defines one side of each half cell. The other side of each half cell is defined by an electronically conducting solid plate, typically comprised of metal, carbon, carbon-polymer composite, or combinations thereof, and generally known as a bipolar plate. The functionality of the bipolar plate is to maintain the fluids in adjacent half cell chambers of adjacent cells separate, while conducting current electronically between the adjacent cells. Each half cell chamber also contains an electronically conducting component generally known as a current collector or current carrier, to conduct current across the half cell chamber, between the electrode and the bipolar plate.

As used herein, the terms "cell stack", "electrolyser stack", "stack", or equivalent variations thereof refer to structures used for practical (commercial) water electrolysers comprising multiple cells, in which the cells typically are electrically connected in series (although designs using cells connected in parallel and/or series also are known), with bipolar plates physically separating but providing electrical communication between adjacent cells. Gas-liquid (i.e., hydrogen-liquid and oxygen-liquid) mixtures are collected from individual half-cells in header flow passages (top flow manifolds), which run lengthwise along the stack, above the cells. The header flow passages fluidly communicate with respective gas-liquid discharge passages extending through the electrolyser stack and in fluid communication with external piping or tubing, which in turn fluidly communicate with external gas-liquid separation vessels. Operations performed in the external gas-liquid separation vessels include gas-liquid separation, and optionally feed water addition and liquid mixing. Degassed liquid is returned to the cell stack via external piping or tubing, which is in fluid communication with respective degassed liquid return passages extending through the electrolyser stack. Degassed liquid is distributed to individual half-cells via footer flow passages (bottom flow manifolds), which run lengthwise along the stack, underneath the cells. In some PEM electrolyser stacks, the hydrogen side is operated without circulating liquid, in which case the hydrogen side header flow passage(s) and discharge passage(s) would carry hydrogen gas, and in which case there would be no requirement for a gas-liquid separation circuit on the hydrogen side.

As used herein, the term "electrolyser module" refers to the combination of an electrolyser stack and gas-liquid separation spaces in the same structure, which typically is of the filter press type. Further, the term "electrolyser module" as used herein may refer to an alkaline electrolyser module or a PEM electrolyser module. We previously disclosed designs for an alkaline electrolyser module in U.S. Pat. No. 8,308,917, and for a PEM electrolyser module in US 2011/0042228, both of which are incorporated herein by reference.

As used herein, the term "structural plate" refers to a body having a sidewall extending between opposite end faces with a half cell chamber opening, and in the case of an electrolyser module, additionally at least one degassing chamber opening extending through the structural plate between the opposite end faces. An electrolyser stack or an electrolyser module typically is constructed using a series of structural plates to define alternately cathode and anode half cell chambers, fluid flow passages, and in the case of an electrolyser module, at least one degassing chamber, and respective gas-liquid flow passages and respective degassed liquid flow passages extending between the one or more degassing chambers and the corresponding half cell chambers. The structural plates are arranged in face to face juxtaposition between opposite end pressure plates, optionally with at least one intermediate pressure plate interspersed between the structural plates along a length of the electrolyser stack or electrolyser module, to form a filter press type structure. The end pressure plates and intermediate pressure plates can be made of, e.g., one or more of steel, stainless steel, nickel-plated steel, nickel-plated stainless steel, nickel and nickel alloy. The structural plates also hold functional components, which may include, for example, cathodes, anodes, separator membranes, current collectors, and bipolar plates, in their appropriate spatial positions and arrangement.

The structural plates are made of a suitable electrically insulating plastic or fiber-reinforced plastic that is inert to electrolyte (e.g., in the case of an alkaline electrolyser module, an aqueous solution of 25% to 35% KOH at elevated temperatures) or water (in the case of a PEM electrolyser module) and gases (e.g., oxygen, hydrogen, nitrogen).

Examples of suitable plastics include polyoxymethylene (POM), polypropylene, polyphenylene oxide (PPO), polyphenylene sulphide (PPS) and the like, and in particular, polysulfone. The structural plates are manufactured by processes such as machining, and more preferably, injection molding, sometimes with some post-machining. Thus, the plates are lightweight, non-conducting, resistant to the operating environment, and amenable to simple and relatively low cost fabrication.

Generally contemplated operating pressures of electrolyser modules and electrolyser stacks lie between atmospheric pressure and 30 barg, and more typically up to 10 barg, depending on the application requirements. Higher pressure operation, for example, in the range of 17 to 30 barg, is advantageous as it enables direct filling of commonly-used gas storage vessels, or a reduced number of mechanical compression stages when filling higher pressure storage. Older electrolyser stack designs utilized steel structural plates, which enabled operation at elevated pressures, e.g., 30 barg, but presented other challenges, such as very high weight, the need for electrical insulation, and potential for corrosion. For modern, "advanced" electrolyser stack and electrolyser module designs utilizing structural plates made of plastic, higher pressure operation presents challenges with regard to mechanical integrity of the structural plates, especially over the long term and for large scale electrolyser modules and electrolyser stacks. Pressure containment means, such as a pressure vessel or a load bearing reinforcing support completely surrounding an electrolyser stack are known in the art (e.g., U.S. Pat. No. 6,153,083, U.S. Pat. No. 7,314,539), but preferably are to be avoided in order to maintain inherent design simplicity, ease of implementation, compactness, lightweight, and low capital cost. The structural plates could be made significantly more massive, but this approach is impractical and also preferably to be avoided, due to correspondingly significantly increased cost, size, weight, and difficulty of injection molding. The approach of reinforcing each structural plate may be preferred if it can be implemented simply, without significantly adverse effects on ease of assembly, compactness, weight and cost.

U.S. Pat. No. 7,332,063 discloses an approach to reinforcement of individual structural plates in an electrolyser stack in which each structural plate is supported externally by a surrounding external wound fibreglass reinforcement, in order to withstand higher operating pressures. The approach of imposing a tight-fitting external support around the external periphery of structural plates is best suited to circular shapes, such as that contemplated in U.S. Pat. No. 7,332,063. However, for large structural plates with complex irregular shapes, this type of external support would be less effective and more difficult and expensive to install.

Thus, what is needed is a simple, easily-implemented, cost effective approach to reinforcement of structural plates for electrolyser modules and electrolyser stacks, especially large-scale electrolyser modules and electrolyser stacks, in order to enable them to operate at higher pressures.

SUMMARY OF THE INVENTION

An electrolyser module comprising a plurality of structural plates each having a sidewall extending between opposite end faces with a half cell chamber opening and at least two degassing chamber openings extending through the structural plate between the opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components define an array of series connected electrolytic cells surmounted by at least one degassing chamber. The structural plates define, at least when in face to face juxtaposition, passages for fluid flow inside the electrolyser module. The electrolyser module further comprises at least one external reinforcing means contacting at least some of the structural plates for mitigating outward displacement of the structural plates. At least some of the structural plates further define contacting means for achieving contact with the at least one external reinforcing means.

A structural plate for an electrolyser module having a sidewall extending between opposite end faces with a half cell chamber opening and at least two degassing chamber openings extending through said structural plate between said opposite end faces. The structural plate defines, at least when in face-to-face juxtaposition with another structural plate, an end pressure plate, or an intermediate pressure plate, passages for fluid flow inside the electrolyser module. The structural plate further defines contacting means for achieving contact with one or more external reinforcing means.

An electrolyser stack comprising a plurality of structural plates each having a sidewall extending between opposite end faces with a half cell chamber opening, at least two header flow passage openings and at least one footer flow passage opening extending through the structural plate between said opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components define an array of series connected electrolytic cells. The structural plates define, at least when in face to face juxtaposition, passages for fluid flow inside the electrolyser stack. The electrolyser stack further comprises one or more external reinforcing means contacting at least some of the structural plates for mitigating outward displacement of the structural plates. At least some of the structural plates further define contacting means for achieving contact with the one or more external reinforcing means.

DESCRIPTION OF DRAWINGS

Preferred embodiments of the present invention are described below with reference to the accompanying illustrations in which.

DESCRIPTION OF PREFERRED EMBODIMENTS

In the present invention, one or more external reinforcing means in contact with at least some of the structural plates are used to increase the internal fluid pressure holding capability of an electrolyser stack or electrolyser module, while at the same time enabling reduction in plastic material requirements and improving the creep resistance and structural plate lifetime. The external reinforcing means have significantly better mechanical properties (e.g., significantly higher strength and elastic modulus) than the plastic or fiber-reinforced plastic material of the structural plates, and preferably are easily installed, readily available, and low cost. Contact between the external reinforcing means and each of the structural plates preferably is achieved through contacting means comprised of interlocking features defined on the peripheral edges of the structural plates and on the external reinforcing means.

Figure 1:
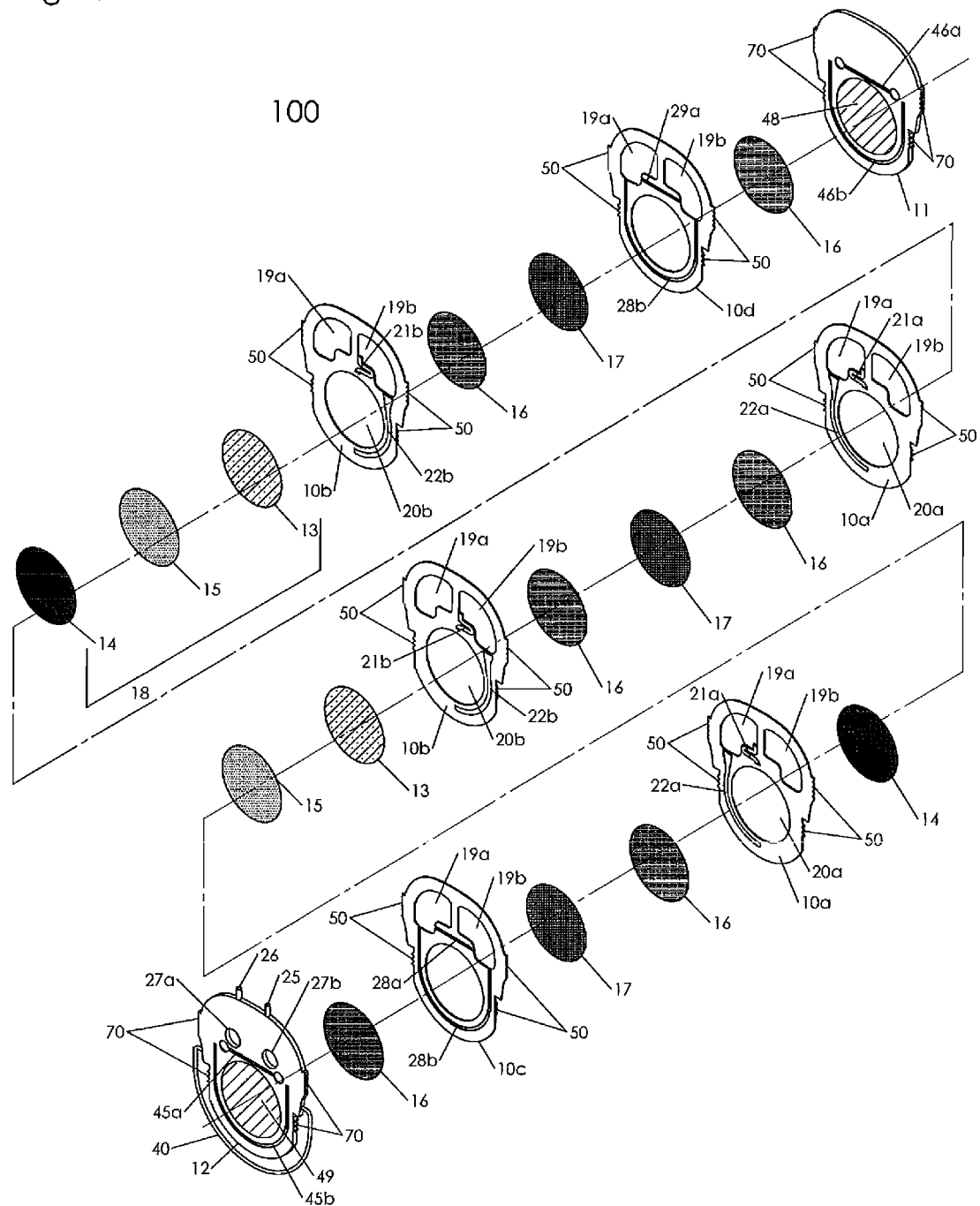
FIG. 1 is an exploded view of about half of an alkaline electrolyser module in accordance with the present invention.

An alkaline electrolyser module in accordance with an aspect of the present invention is shown generally at 100 in FIG. 1. FIG. 1 shows about half of an alkaline electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. Alkaline electrolyser module 100 includes structural plates 10, end pressure plates 11, anodes 13, cathodes 14, membranes 15, current carriers 16, bipolar plates 17, and optionally, one or more intermediate pressure plates 12 interspersed between structural plates along the length of the electrolyser module. The structural plates 10, end pressure plates 11 and intermediate pressure plates 12 comprise at least a body having a sidewall extending between opposite end faces. There are two main types of structural plates 10: cathode structural plates 10a and anode structural plates 10b. Additionally, special structural plates 10c and 10d can optionally be used on either side of the one or more optional intermediate pressure plate 12 and also optionally adjacent to either or both of the end pressure plates 11, e.g., to help to accommodate cooling conduits (e.g., cooling tubes or cooling coils). (As used herein, the term "plate" refers to structural plates, special structural plates, end pressure plates and intermediate pressure plates.) Suitable seals (e.g., o-ring gaskets, not shown) also are understood to be included. At least some of structural plates 10a and 10b and special structural plates 10c and 10d also can be in contact with at least one external reinforcing means. Although external reinforcing means are not explicitly shown in FIG. 1 for better clarity of the electrolyser module assembly, they are shown in other Figures, and key elements of an especially preferred embodiment are shown in FIG. 1, namely: i) contacting means 50 in the structural plates, for achieving multi-directional contact with external reinforcing means; and, ii) supporting means 70 in the intermediate pressure plates and the end pressure plates, for supporting and aligning external reinforcing means. Not all of the structural plates may necessarily require external reinforcement; for example, if special structural plates are used, especially at moderate pressures, they may not require external reinforcing means, since they lack fluid flow passages (i.e., they contain more material), and also they are somewhat inherently reinforced by the adjacent end pressure plate 11 or intermediate pressure plates 12. Accordingly, some of the structural plates, e.g., one or more special structural plates, may be made without contacting means 50 and used without external reinforcing means. Also, structural plates adjacent to an end pressure plate or an intermediate pressure plate may be directly mechanically reinforced by embedding them into the adjacent end pressure plate or intermediate pressure plate. However, there is little benefit to not utilizing external reinforcing means with certain of the structural plates, since the external reinforcing means are readily available if they are to be used with other structural plates, and use of the external reinforcing means also helps to align the structural plates in question with the rest of the electrolyser module assembly.

Alkaline electrolyser module 100 thus comprises a plurality of electrolysis cells 18 and associated degassing chambers 19. The electrolysis cells 18 preferably are located at the bottom part of the electrolyser module 100, and the associated degassing chambers 19 preferably are located at the top part of the electrolyser module 100, surmounting the electrolysis cells 18. The electrolysis cells comprise cathode and anode half cell chambers 20a and 20b defined by two adjacent structural plates, as well as a cathode 14, an anode 13, a membrane 15, and current collectors 16. More than one current collector 16 can be used per half cell chamber 20a and/or 20b. Bipolar plates 17 physically separate, and provide electrical communication between, adjacent cells. The membrane is in communication with each of the electrodes for providing ionic conduction. End pressure plates 11 and intermediate pressure plates 12 optionally include suitably coated or plated electrically conducting areas or separate parts 48 and 49, respectively, to facilitate electrical current flow through the portions of the end pressure plates and intermediate pressure plates corresponding to the active cell area. End pressure plates 11 and intermediate pressure plates 12 can be made of, e.g., one or more of steel, stainless steel, nickel-plated steel, nickel-plated stainless steel, nickel and nickel alloy, or other plated, coated, or non-plated, non-coated metals (the term "metals" is to be understood to include metals and metal alloys).

As shown in FIG. 1, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the intermediate pressure plate 12, or in one or both of the end pressure plates 11. Feed water is introduced to one or both of the hydrogen and oxygen degassing chambers 19a and 19b through feed water passages (not shown), which also typically are located in the one or more intermediate pressure plates 12 or in one or both of the end pressure plates 11. Electrical current is supplied to the cell portion of electrolyser module 100 by, for example, a DC power supply, most commonly via positive and negative electrical connections to end pressure plates 11, and optionally with a non-current carrying electrical ground connection to intermediate pressure plate 12 at the midpoint of electrolyser module 100.

Figure 2:
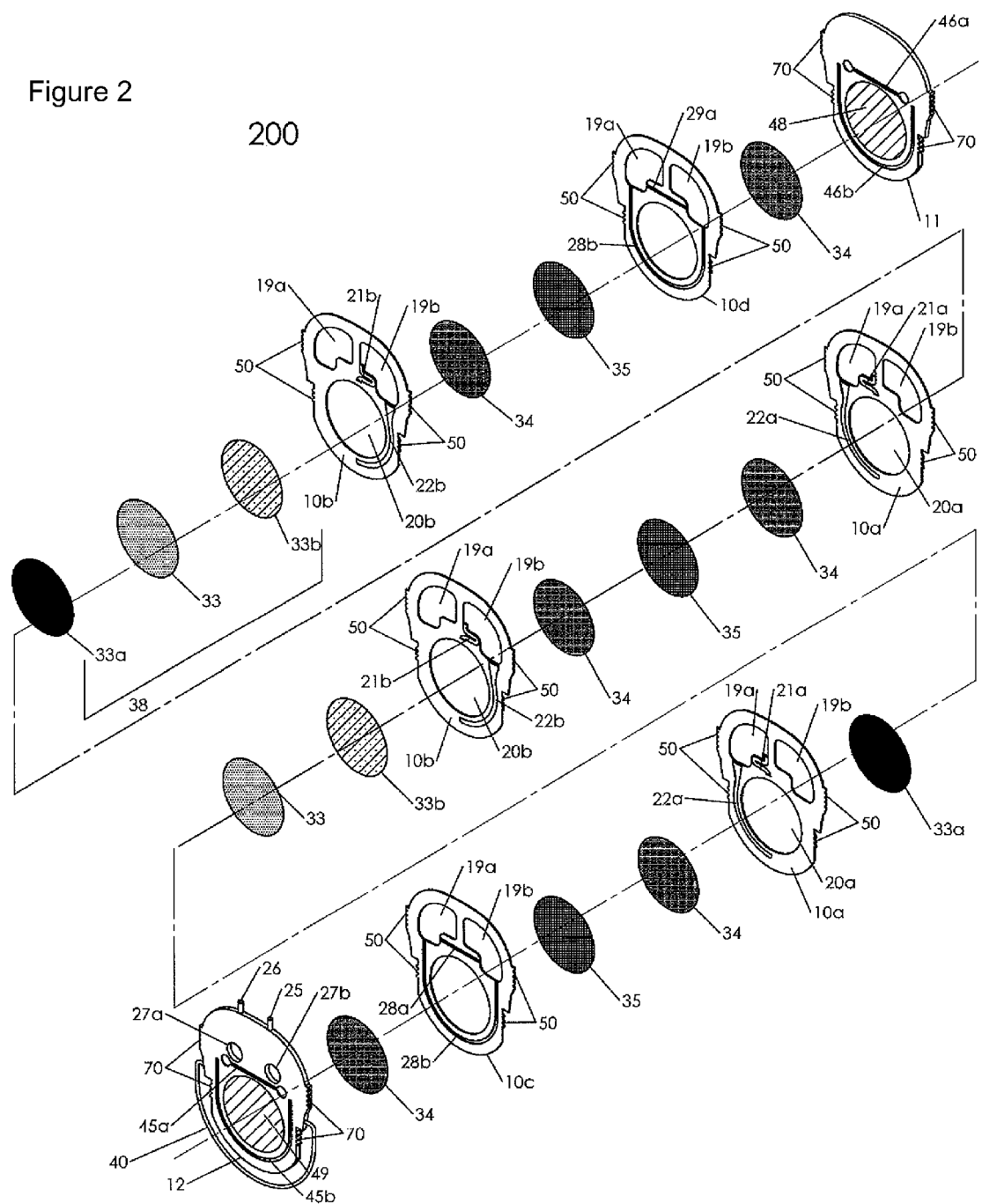
FIG. 2 is an exploded view of about half of a PEM electrolyser module in accordance with the present invention.

A PEM electrolyser module in accordance with an aspect of the present invention is shown generally at 200 in FIG. 2.

FIG. 2 shows about half of an electrolyser module with 4 cells for illustrative purposes only; the other half of the electrolyser module would be a mirror image (on either side of feature 12, which in this case represents the midpoint of the electrolyser module). In practice, typically greater numbers of cells would be incorporated. PEM electrolyser module 200 includes structural plates 10, end pressure plates 11, membrane-electrode assemblies (MEA's) 33, optionally electrode backing layers 33a and 33b, current carriers 34, bipolar plates 35 and optionally, one or more intermediate pressure plates 12. The structural plates 10, end pressure plates 11 and intermediate pressure plates 12 comprise at least a body having a sidewall extending between opposite end faces. A typical MEA consists of a membrane and electrodes coated onto opposite faces of the membrane; a cathode coated onto one face of the membrane, and an anode coated onto the opposite face of the membrane. Thus, the membrane is in communication with each of the two electrodes for providing ionic conduction. In some embodiments, the electrode backing layers 33a and 33b also can be incorporated into the MEA 33. In the embodiment shown in FIG. 2, there are two main types of structural plates 10: cathode structural plates 10a and anode structural plates 10b. Additionally, special structural plates 10c and 10d can optionally be located adjacent to the optional intermediate pressure plate 12 and the end pressure plates 11, respectively, e.g., to help accommodate cooling conduits (e.g., cooling tubes or cooling coils). Suitable seals (e.g., o-ring gaskets, not shown) also are understood to be included. At least some of structural plates 10 and special structural plates 10c and 10d may be in contact with at least one external reinforcing means. Although external reinforcing means are not shown in FIG. 2 for better clarity of the electrolyser module assembly, key elements of an especially preferred embodiment are shown in FIG. 2, namely contacting means 50 in the structural plates, for achieving multi-directional contact with external reinforcing means, and supporting means 70 in the intermediate pressure plate and the end pressure plates, for supporting and aligning external reinforcing means. Not all of the structural plates may necessarily require external reinforcement; for example, if special structural plates are used, especially at moderate pressures, they may not require external reinforcing means, since they lack fluid flow passages (i.e., they contain more material), and also they are somewhat inherently reinforced by the adjacent end pressure plate 11 or intermediate pressure plates 12. Accordingly, some of the structural plates, e.g., one or more special structural plates, may be made without contacting means 50 and used without external reinforcing means. Also, structural plates adjacent to an end pressure plate or an intermediate pressure plate may be directly mechanically reinforced by embedding them into the adjacent end pressure plate or intermediate pressure plate. However, there is little benefit to not utilizing external reinforcing means with certain of the structural plates, since the external reinforcing means are readily available if they are to be used with other structural plates, and use of the external reinforcing means also helps to align the structural plates in question with the rest of the electrolyser module assembly.

PEM electrolyser module 200 thus comprises a plurality of electrolysis cells and associated hydrogen degassing chamber 19a and oxygen degassing chamber 19b. The PEM electrolysis cells 38 preferably are located at the bottom part of the electrolyser module 200, and the associated degassing chambers 19a and 19b preferably are located at the top part of the electrolyser module 200, surmounting the PEM electrolysis cells 38. The electrolysis cells comprise cathode and anode half cell chambers 20a and 20b defined by two adjacent structural plates, as well as a MEA 33, optionally electrode backing layers 33a and 33b, and the current collectors 34. Bipolar plates 35 physically separate and provide electrical communication between adjacent cells. End pressure plates 11 and intermediate pressure plates 12 optionally include suitably coated or plated electrically conducting areas or separate parts 48 and 49, respectively, to facilitate electrical current flow through the portions of the end pressure plates and intermediate pressure plates corresponding to the active cell area. End pressure plates 11 and intermediate pressure plates 12 can be made of, e.g., one or more of steel, stainless steel, plated or coated steel, plated or coated stainless steel, or other plated, coated or non-plated, non-coated metals (the term "metals" is to be understood to include metals and metal alloys).

As shown in FIG. 2, each cathode half cell chamber 20a is in direct fluid communication with the hydrogen degassing chamber 19a via a gas-liquid flow passage 21a, and a degassed liquid flow passage 22a. Similarly, each anode half cell chamber 20b is in direct fluid communication with the oxygen degassing chamber 19b via a gas-liquid flow passage 21b, and a degassed liquid flow passage 22b. Separated hydrogen gas exits through hydrogen gas discharge passage 25, which extends radially through to the hydrogen degassing chamber; separated oxygen gas exits through separated oxygen gas discharge passage 26, which extends radially through to the oxygen degassing chamber. Gas discharge passages 25 and 26 typically are contained in the intermediate pressure plate 12, or in one or both of the end pressure plates 11. Feed water is introduced to one or both of the hydrogen and oxygen degassing chambers 19a and 19b through feed water passages (not shown), which also typically are located in the intermediate pressure plate 12 or in one or both of the end pressure plates 11. Electrical current is supplied to the cell portion of electrolyser module 200 by, for example, a DC power supply, most commonly via positive and negative electrical connections to end pressure plates 11, and optionally with a non-current carrying electrical ground connection to intermediate pressure plate 12 at the midpoint of electrolyser module 200.

If the electrolyser module 100 or 200 is to be operated with substantially equal oxygen side and hydrogen side pressures, the bottom portions of degassing chambers 19a and 19b can be in fluid (liquid only) communication, e.g., via one or more liquid communication passages. Examples of preferred embodiments of liquid communication passages are: internal passages contained in one of more of intermediate pressure plate 12, end pressure plates 11 and special structural plates 10c and 10d; passages formed by surface channels in at least one of the opposite end faces of one or more of intermediate pressure plate 12 and end pressure plates 11, at least when in face-to-face juxtaposition with adjacent special structural plates 10c and 10d, respectively; passages formed by surface channels in at least one of the opposite end faces of one or more of special structural plates 10c and 10d, at least when in face-to-face juxtaposition with adjacent intermediate pressure plate 12, end pressure plate 11, respectively, or structural plates 10a and 10b; and, external passages, comprised of, e.g., tube or pipe, in liquid communication with degassing chambers 19a and 19b via internal passages in intermediate pressure plate 12 or end pressure plate 11. Illustrative examples are shown in FIGS. 1 and 2: (i) features 28a and 28b in special structural plates 10c; (ii) features 29a and 29b in special structural plates 10d; and, (iii) feature 40, which is tube or pipe in liquid communication with the lower portion of the hydrogen degassing chamber and the oxygen degassing chamber via respective interior passages in intermediate pressure plate 12; (iv) features 45a and 45b in intermediate pressure plate 12 and features 46a and 46b in end pressure plate 11. Features 28a, 28b, 29a, 29b, 45a, 45b, 46a and 46b are shown as surface channels, but could be corresponding internal passages. It is to be understood that the actual path of the liquid communication passages and the relative size of the liquid communication passages need not be exactly as shown in the illustrative cases of FIGS. 1 and 2, and further that appropriate combinations of features 28a, 28b, 29a, 29b, 40, 45a, 45b, 46a and 46b may be used. In certain embodiments, some of features 28a and 28b, 29a and 29b, and 45a and 45b can be included on both sides of special structural plates 10c and 10b, and intermediate pressure plate 12, respectively. Such liquid communication between degassing chambers 19a and 19b may facilitate (near) equalization of the liquid levels in the degassing chambers, and thereby the hydrogen side and oxygen side pressures during operation, and further, may facilitate rapid, passive response for correction of operational upsets.

Figure 3:
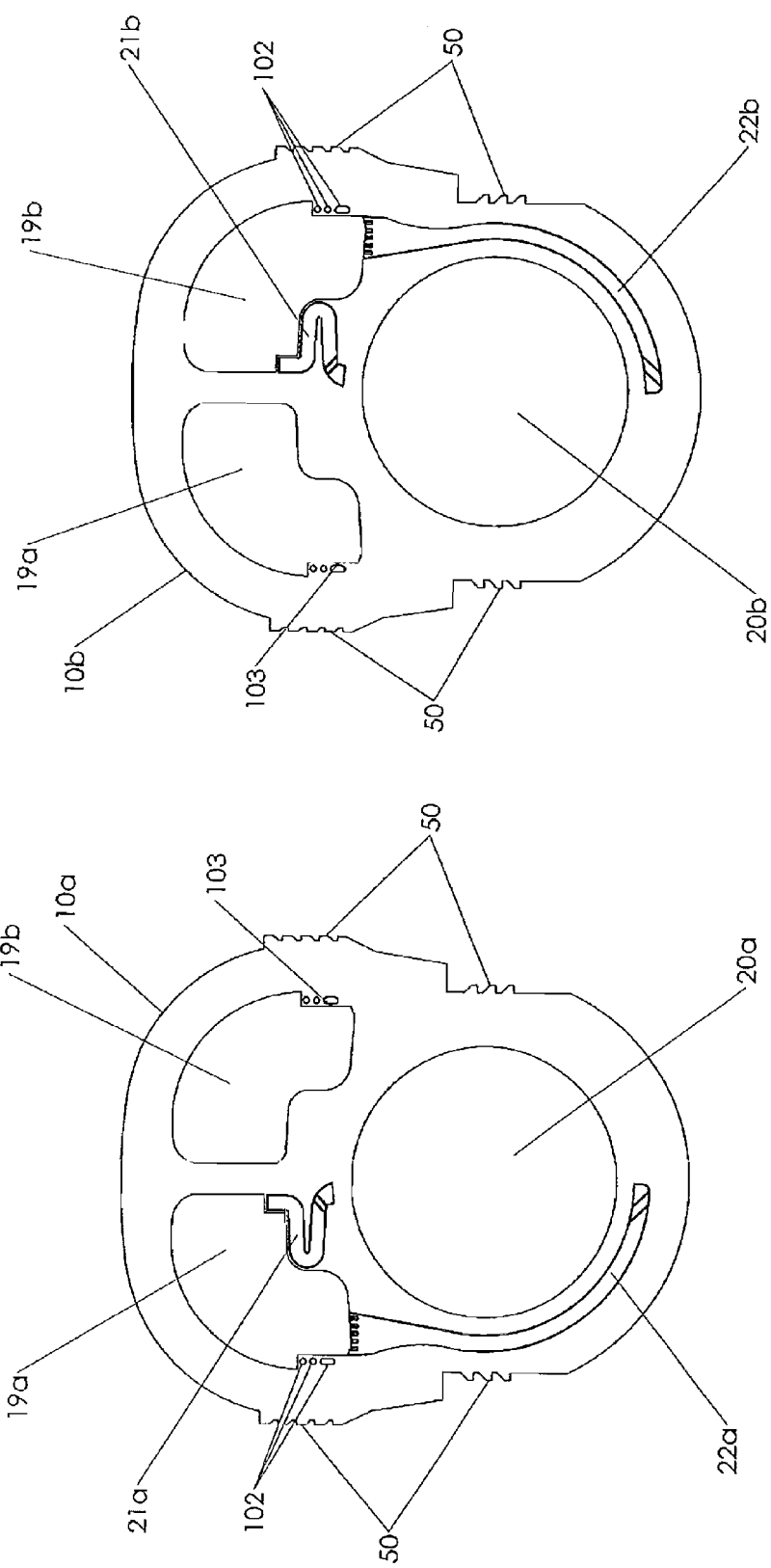
FIG. 3 is a front elevation showing the front face of an embodiment of structural plates for use with external reinforcing means, as well as a preferred embodiment of feed water addition features, in accordance with the present invention.
Figure 4:
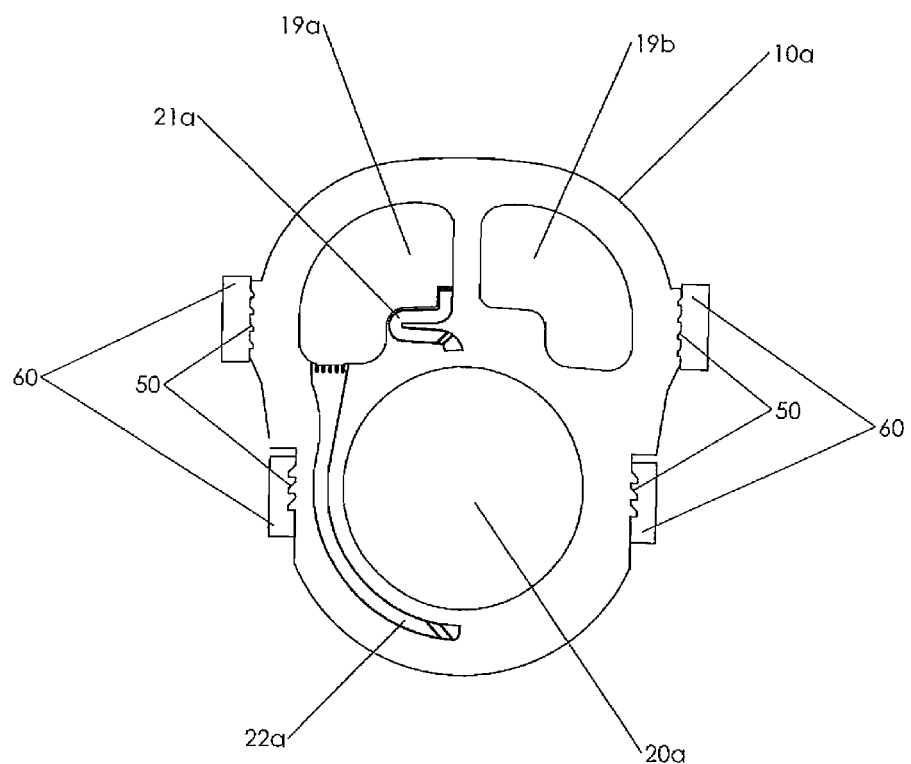
FIG. 4 is a front elevation showing the front face of an embodiment of a structural plate and external reinforcing means in accordance with the present invention.

Structural plates for an electrolyser module in accordance with an aspect of the present invention are shown in FIG. 3. FIG. 3 shows a preferred embodiment in which structural plate 10a defines one half cell chamber opening 20a and two degassing chamber openings 19a and 19b; it is understood that each structural plate can define more than one of each type of opening. The structural plates define at least when in face to face juxtaposition, passages for fluid flow inside the electrolyser module. Structural plate 10a defines one or more gas-liquid flow passages 21a, which provide direct fluid communication between the top part of the half cell chamber opening 20a to one of the degassing chamber openings 19a and 19b. Structural plate 10a further defines one or more degassed liquid flow passages 22a, which provide direct fluid communication between the bottom part of the half cell chamber opening 20a to one of the degassing chamber openings 19a and 19b. Gas-liquid flow passages 21 become interior passages (slot-shaped through holes) near the top of half cell chamber opening 20; similarly, degassed liquid flow passages 22 become interior passages (slot-shaped through holes) near the bottom of half cell chamber opening 20. Structural plate 10a also includes contacting features (not shown) for locating and holding seals (e.g., o-ring gaskets) and in an especially preferred embodiment, contacting means 50 for locating and interlocking with similar contacting means on one or more external reinforcing means 60 at desired points of contact on its peripheral edge, as shown in FIG. 4. Similar supporting means, shown as 70 in FIGS. 1 and 2, can be included on end pressure plates 11 and optionally on the one or more intermediate pressure plates 12, for supporting and aligning the external reinforcing means. The structural plates are made of a suitable electrically insulating plastic or fiber-reinforced plastic. Examples of suitable plastics include polyoxymethylene (POM), polypropylene, polyphenylene oxide (PPO), polyphenylene sulphide (PPS) and the like, and in particular, polysulfone. Structural plates 10a and 10b shown in FIG. 3 correspond to cathode (hydrogen) structural plates 10a and anode structural plates 10b in FIGS. 1 and 2. The anode (oxygen) structural plate 10b is the mirror image of the cathode (hydrogen) structural plate 10a.

FIG. 3 also shows features for a particularly preferred feed water addition system, which comprises entry passages in one or more of the end pressure plates 11 and/or one or more intermediate pressure plates 12, which are in fluid communication on one end with an external feed water source, and on the other end with one or more feed water manifolds formed by feed water openings 102 in structural plates 10. Feed water openings 102 in turn further fluidly communicate in one or more of the structural plates 10 with one or more of the first and second degassing chambers 19a and 19b via water flow passages 103. Typically, water flow passages 103 in cathode structural plates 10a are in fluid communication with hydrogen degassing chamber 19a, and water flow passages 103 in anode structural plates 10b are in fluid communication with oxygen degassing chamber 19b, or vice-versa, such that water flow passages connect to opposite degassing chambers in adjacent structural plates. Preferably, separate feed water passages are used to add liquids to hydrogen degassing chamber 19a and oxygen degassing chamber 19b. It is to be understood that the structural plates shown in FIG. 3 do not have to include features 102 and 103, and conversely that any of the structural plates shown in the other Figures can additionally comprise features 102 and 103.

Figure 5:
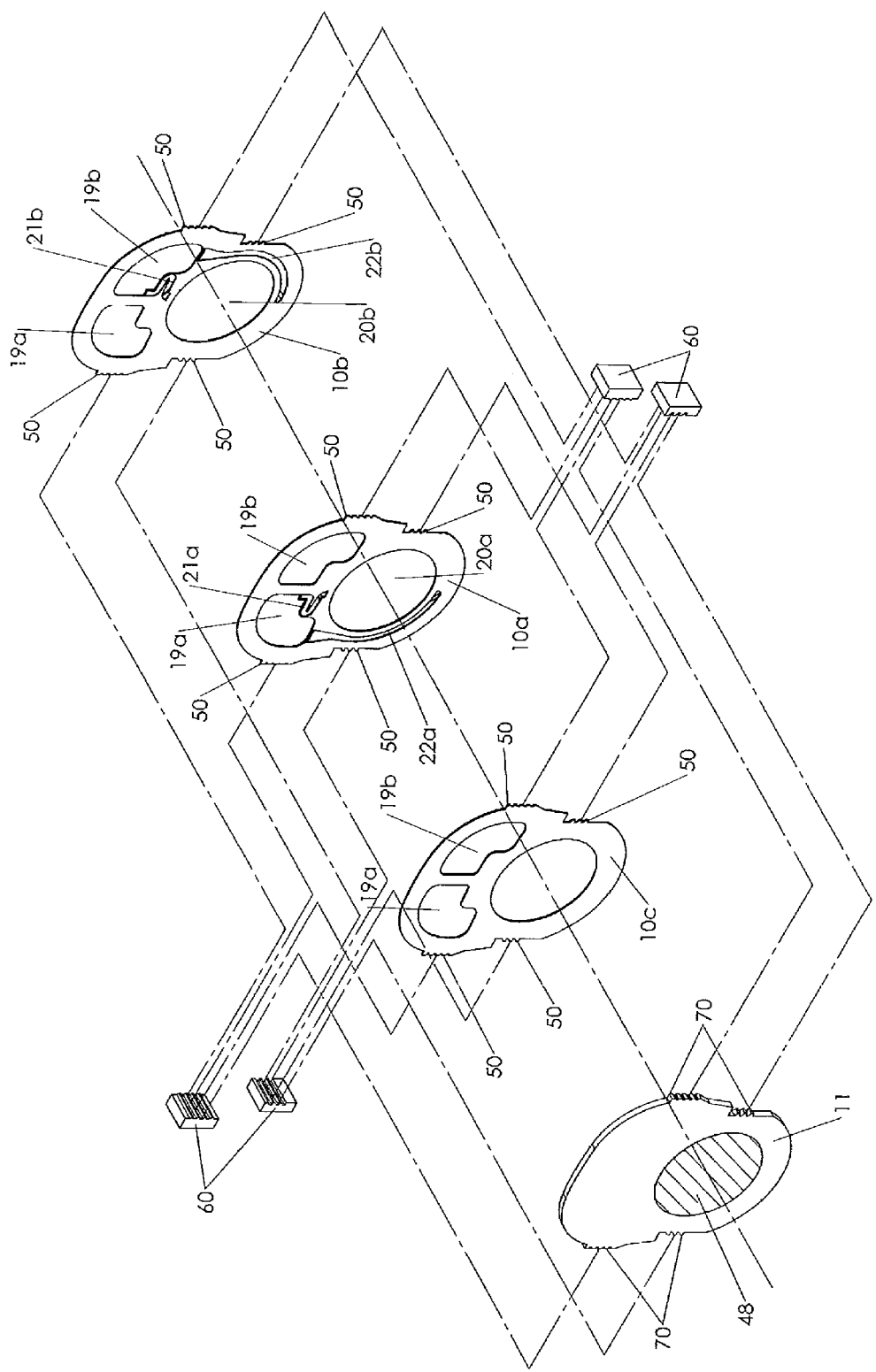
FIG. 5 is an isometric view showing the front faces of an embodiment of structural plates, an end pressure plate and external reinforcing means for an electrolyser module in accordance with the present invention.

FIG. 5 shows an exploded view of a preferred embodiment; only three structural plates 10a, 10b, and 10c and one end pressure plate 11 are shown; other components, such as cell components, seals, etc. are not shown for clarity. Four external reinforcing means 60 are used, each comprising a main body comprised of, for example, metal beams or tubes which run along the length of the electrolyser module. Two external reinforcing means 60 are used on each side of the module; it is to be understood that although the structural plates and end pressure plate are shown as exploded assembly views, each reinforcing means 60 is represented as a non-exploded view in FIG. 5, for overall clarity. The external reinforcing means also could be "U"-shaped or "ring"-shaped, in which case in the preferred embodiment illustrated in FIG. 5 there would only two external reinforcing means at two different heights, each contacting the structural plates on either side. However, the external reinforcing means do not necessarily have to cover the full length of the electrolyser module; for example, if there is an intermediate pressure plate, it may be convenient to have each set of external reinforcing means cover from one end pressure plate to the intermediate pressure plate. The contacting means of the external reinforcing means 60 that contact the structural plates are comprised of features such as machined teeth that interlock with corresponding similarly-shaped contacting means 50 defined on the side walls of the structural plates. There also can be similarly-shaped supporting means 70 on the side walls of end pressure plates 11 and intermediate pressure plates 12, for supporting and aligning external reinforcing means 60. The contacting means of the external reinforcing means can be, e.g., machined directly into the main body, or e.g., machined into a plate and attached to the main body. The teeth are angled to provide contact in multiple directions, thereby providing multi-directional support and strength. The external reinforcing means therefore mitigate outward displacement of the plastic structural plate material in response to fluid pressure within the electrolyser module. A key benefit is stress relief in the middle sections of the structural plate, where complex features such as at the entrance of the gas-liquid passage would otherwise be focal points for stress development at higher operating pressures (e.g., 25 bar). The external reinforcing means also enable minimization of plastic material around the periphery of the structural plates, reducing cost, part size and weight, and shot size for injection molding.

The external reinforcing means preferably are located in a symmetrical manner, with contact points being mirror images on opposite sides of the peripheries of the structural plates. In the preferred embodiment shown in FIG. 5, there are two external reinforcing means 60 on each side, with reinforcing locations (points of contact with contacting means 50 on the structural plates) located approximately one-third of the way down from the top of the structural plates, and approximately one-third of the way up from the bottom of the structural plates. The vertical distance between the two external reinforcing means on each side of the electrolyser module is therefore about one-third the height of the structural plates.

The external reinforcing means for all the embodiments described herein have significantly better mechanical properties (e.g., significantly higher strength and elastic modulus) than the plastic or fiber reinforced plastic comprising the bodies of the structural plates, and preferably are easily installed, readily available, and low cost. Preferred materials are metals, plated metals or coated metals (the term "metals" is to be understood to include metals and metal alloys), most preferably steel or stainless steel, which are commonly available as tubes or beams, and which provide good mechanical properties at relatively low cost.

The external reinforcing means are straightforwardly installed after assembly of the electrolyser module, and are attached to one or more of the end pressure plates and the one or more intermediate pressure plates. The points of connection of the external reinforcing means to the end pressure plates preferably are electrically insulated. Installation involves holding in place the one or more external reinforcements on one side of the electrolyser module by attaching (pinning) them to one or more of the end pressure plates and the one or more intermediate pressure plates, and then attaching the corresponding one or more external reinforcing means on the other side of the electrolyser module in a similar manner, except using one or more adjustment mechanisms (e.g., threaded adjustments) to make adjustments in place to achieve good contact of the contacting means of the external reinforcing means and the structural plates. Also, some pre-stressing may be applied to the structural plates through the adjustment mechanisms.

Although for lower pressure containment requirements (e.g., 5-10 bar), use of external reinforcing means may not be strictly required, inclusion of external reinforcing means can ensure long-term mechanical integrity of the structural plates with relatively little increased initial cost.

Example 1

Figure 6:
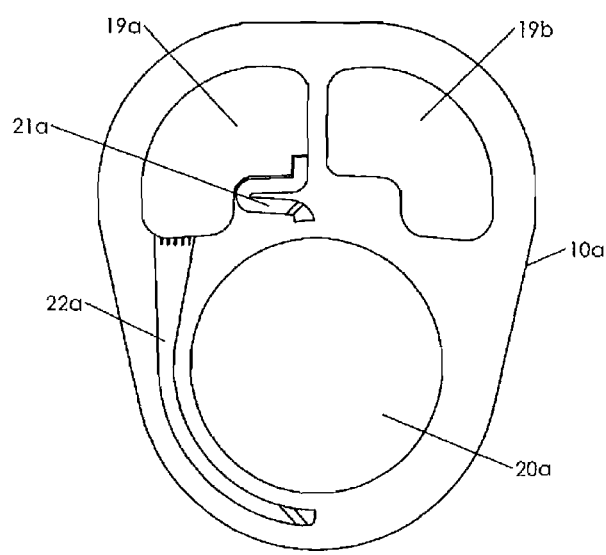
FIG. 6 is a front elevation showing the front face of an embodiment of a structural plate for an electrolyser module without external reinforcing means in accordance with a prior design.

Stresses in a structural plate for an electrolyser module according to a prior design were modeled by finite element analysis (FEA). The general structural plate configuration was as shown in FIG. 6. The outermost dimensions of the structural plate were 1505 mm wide, 1,828 mm high, and 12 mm thick. The half cell chamber opening was 6,000 cm$^2$. The structural plate was made of polysulfone. Modeling at 25 bar internal pressure showed an unacceptable stress distribution with high stresses and displacements.

Example 2

Stresses in a structural plate for an electrolyser module according to the present invention were modeled by FEA. The general structural plate and external reinforcing means configuration as shown in FIG. 4. The external reinforcing means 60 were steel beams. The outermost dimensions of the structural plate were 1,476 mm wide, 1,773 mm high, and 12 mm thick. The half cell chamber opening was 6,000 cm$^2$. The structural plate was made of polysulfone. The amount of polysulfone used was 41% less than the prior design part shown in FIG. 6. Modeling at 25 bar internal pressure showed an acceptable stress distribution with low stresses and displacement.

Although the embodiments above have focussed on electrolyser modules, the same principles can apply to electrolyser stacks. For example, an electrolyser stack comprises a plurality of structural plates each having a sidewall extending between opposite end faces with a half cell chamber opening, with at least two header flow passage openings and at least one footer flow passage opening extending through each structural plate between its opposite end faces. The structural plates are arranged in face to face juxtaposition between opposite end pressure plates. Each half cell chamber opening at least partially houses electrolytic half cell components comprising at least an electrode, a bipolar plate in electrical communication with the electrode, and a membrane communicating with the electrode for providing ionic conduction. The structural plates and half cell components therefore define an array of series connected electrolytic cells. The structural plates also define, at least when in face to face juxtaposition, passages for fluid flow inside the electrolyser stack. The electrolyser stack further comprises at least one external reinforcing means contacting at least some of the structural plates for mitigating outward displacement of the structural plates. At least some of the structural plates further define contacting means for aligning and achieving multi-directional contact with the external reinforcing means. The electrolyser stack can further comprise at least one intermediate pressure plate interspersed between the structural plates along the length of the electrolyser stack.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

The invention claimed is:

1. An electrolyser module comprising a plurality of structural plates each having a sidewall extending between opposite end faces with a half cell chamber opening and at least two degassing chamber openings extending through said structural plate between said opposite end faces;

said structural plates being arranged in face-to-face juxtaposition in a longitudinal stacking direction between opposite end pressure plates, each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells surmounted by at least one degassing chamber;

said structural plates defining, at least when in face-to-face juxtaposition, passages for fluid flow inside said electrolyser module;

said electrolyser module further comprising at least one external reinforcing means contacting at least one of said structural plates for mitigating outward displacement of said structural plates in a direction transverse to said longitudinal stacking direction;

said at least one of said structural plates further defining contacting means for achieving contact with said at least one external reinforcing means.

2. An electrolyser module as claimed in claim 1, further comprising at least one intermediate pressure plate, comprising at least a body, interspersed between said structural plates along a length of said electrolyser module.

3. An electrolyser module as claimed in any of claims 1 and 2, wherein said at least one external reinforcing means comprises a main body that runs along the length of said electrolyser module, and further comprises contacting means which contact similarly-shaped contacting means on the side walls of at least some of said structural plates to achieve contact between said at least one external reinforcing means and said at least some of said structural plates.

4. An electrolyser module as claimed in claim 2, wherein said at least one external reinforcing means is attached to at least one of said end pressure plates and said at least one intermediate pressure plate.

5. An electrolyser module as claimed in claim 2, further comprising at least one feed water passage passing through at least one of said end pressure plates and said at least one intermediate pressure plate, and then passing through said structural plates.

6. An electrolyser module as claimed in claim 1 and 2, wherein said structural plates are comprised of at least one of plastic and fiber-reinforced plastic.

7. An electrolyser module as claimed in claim 6, wherein said plastic is comprised of at least one of polysulfone, polyphenylene oxide, polyphenylene sulphide, polypropylene, and polyoxymethylene.

8. An electrolyser module as claimed in claim 6, wherein said at least one external reinforcing means comprise parts having significantly higher strength and elastic modulus than said at least one of plastic and fiber-reinforced plastic.

9. An electrolyser module as claimed in claim 8, wherein said at least one external reinforcing means is comprised of at least one of metal, plated metal and polymer-coated metal.

10. An electrolyser module as claimed in claim 9, wherein said metal comprises at least one of steel and stainless steel.

11. A structural plate for an electrolyser module having a sidewall extending between opposite end faces with a half cell chamber opening and at least two degassing chamber openings extending through said structural plate between said opposite end faces;
    said structural plate defining, at least when in face-to-face juxtaposition in a longitudinal stacking direction with at least one of another structural plate, an end pressure plate, and an intermediate pressure plate, passages for fluid flow inside said electrolyser module;
    said structural plate further defining contacting means for achieving contact with at least one external reinforcing means for mitigating outward displacement of said structural plate in a radial direction transverse to said longitudinal stacking direction.

12. An electrolyser stack comprising a plurality of structural plates each having a sidewall extending between opposite end faces with a half cell chamber opening, at least two header flow passage openings and at least one footer flow passage opening extending through said structural plate between said opposite end faces;
    said structural plates being arranged in face-to-face juxtaposition between opposite end pressure plates;
    each said half cell chamber opening at least partially housing electrolytic half cell components comprising at least an electrode, a bipolar plate in electrical communication with said electrode, and a membrane communicating with said electrode for providing ionic conduction, said structural plates and half cell components defining an array of series connected electrolytic cells;
    said structural plates defining, at least when in face-to-face juxtaposition in a longitudinal stacking direction, passages for fluid flow inside said electrolyser module;
    said electrolyser stack further comprising at least one external reinforcing means contacting at least one of said structural plates for mitigating outward displacement of said structural plates in a direction transverse to said longitudinal stacking direction; and
    said at least one of said structural plates further defining contacting means for achieving contact with said at least one external reinforcing means.

13. An electrolyser stack as claimed in claim 12, further comprising at least one intermediate pressure plate, comprising at least a body, interspersed between said structural plates along a length of said electrolyser stack.

14. The electrolyser module as claimed in any one of claims 1 and 2, further comprising at least one liquid communication passage for liquid communication between said at least first and second degassing chambers.

* * * * *